March 17, 1970  F. R. PROSL, JR., ET AL  3,500,860
CONNECTOR

Filed July 11, 1966  2 Sheets-Sheet 1

INVENTORS
FRANK R. PROSL, JR.
BRADFORD J. BOOKER
BY Norman Friedland
ATTORNEY

United States Patent Office

3,500,860
Patented Mar. 17, 1970

3,500,860
CONNECTOR
Frank R. Prosl, Jr., East Granby, and Bradford J. Booker, Glastonbury, Conn., assignors to United Aircraft Corporation, East Hartford, Conn., a corporation of Delaware
Filed July 11, 1966, Ser. No. 564,116
Int. Cl. F16l *37/28*
U.S. Cl. 137—614.03        6 Claims

ABSTRACT OF THE DISCLOSURE

This invention relates to a fluid connector with two separate flow paths that automatically prevents leakage upon disconnection. The coupling consists of two male connectors and one female connector. The male connectors must be inserted into the female connector in a predetermined sequence.

ORIGIN OF THE INVENTION

The invention described herein was made in the performance of work under a NASA Contract and is subject to the provisions of Section 305 of the National Aeronautics and Space Act of 1958. Public Law 85–568 (72 Stat. 435; 42 U.S.C. 2457).

This invention relates to fluid connectors and particularly to connectors that automatically prevent leakage upon disconnecting.

As a result of the advent of space exploration requiring that an astronaut be encapsulated in a space suit, it is necessary for environmental control purposes to connect the internal mechanism of the space suit with an external member by way of a connector, which connector must permit the passage of the fluid without permitting leakage to occur. As for example, provisions must be made to conduct the heat transfer medium (water) to and from the water-cooled underwear of the type described and claimed in U.S. application Ser. No. 394,548 filed by D. Jennings on Sept. 4, 1964, and assigned to the same assignee. The connector must not only prevent the leakage of the water but also must prevent the escapement of the pressurized fluid that surrounds the wearer internally of the suit. Thus among the characteristics necessary for a suitable connetcor which is provided for by virtue of this invention are (1) pressure integrity of the space suit from pressures inside and outside of the suit, (2) rapid connection and disconnection with one hand and no visual aid, (3) flow in through one circuit of the connector and out through the second circuit of the connector with a minimum pressure drop, (4) shutoff capabilities when uncoupling the circuits both inside and outside the space suit, (5) minimum leakage when disconnected, connected, and during connection and disconnection, (6) means for preventing the device from unlatching and becoming disconnected inadvertently, (7) a minimum protrusion of the connector inside the suit so as not to interfere with the wearer thereof, (8) a minimum amount of intake of gases during connection, (9) minimum weight, (10) afford high degree of repeatability and long life although subjected to repeated use, (11) capable of withstanding the vibratioins subjected as a result of outer space usages, and (12) be capable of operating over a wide range of pressures without incurring a degradation of performance.

It is therefore an object of this invention to provide connecting means which afford the advantages enumerated above.

A still further object of this invention is to provide in a fluid connector as described means which allow connecting and disconnecting at low force levels which is occasioned by the fact that the movable valving elements are not subjected to fluid pressure that may otherwise have to be overcome in connecting and disconnecting.

Other features and advantages will be apparent from the specification and claims and from the accompanying drawings which illustrate an embodiment of the invention.

Figure 1:
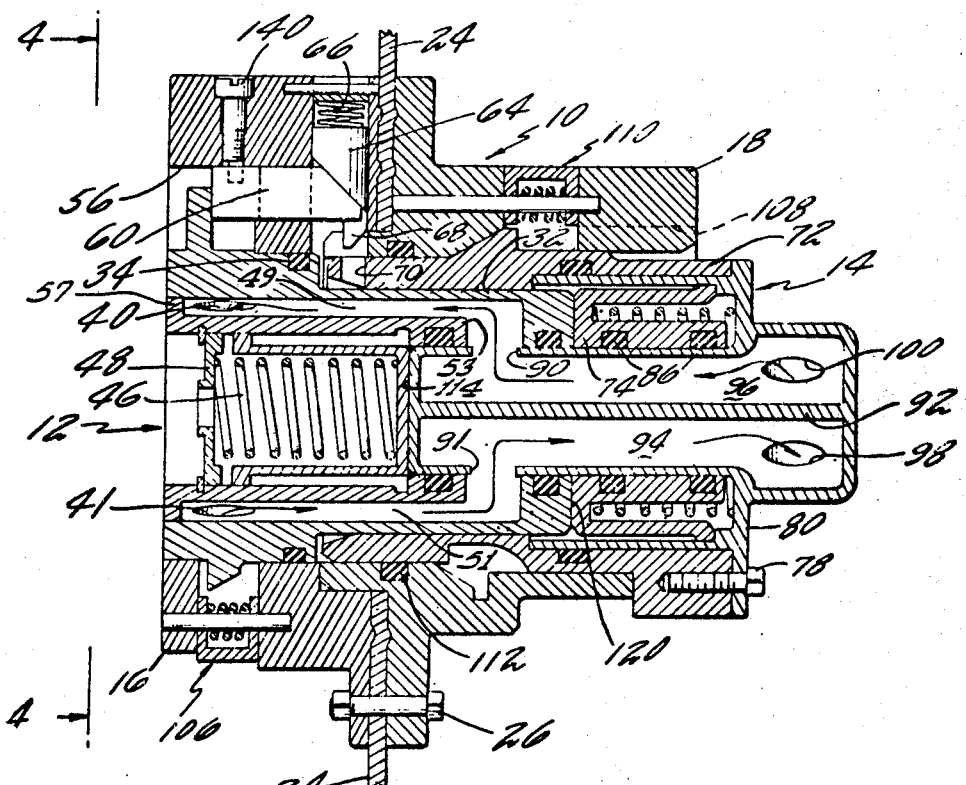
FIGURE 1 is a sectional view of the connector when connected.
Figure 2:
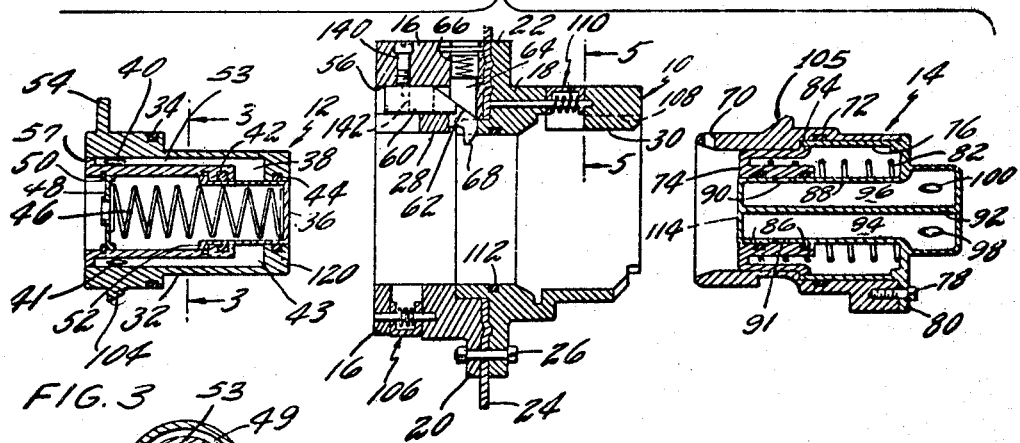
FIGURE 2 is a sectional view of the individual parts when disconnected.

Referring now more particularly to FIGURES 1 and 2 which show the preferred embodiment of this invention as comprising three major parts, namely, female connector generally illustrated by numeral 10, internal male connector generally indicated by numeral 12 and external male connector generally indicated by numeral 14. What is meant by internal and external connectors is that the internal connector is the one that is mounted internally of the suit and the external connector is the one mounted external or on the outside of the suit. As can be seen from FIGURES 1 and 2, the female connector consists of two casings 16 and 18 each carrying end radially extending flanges 20 and 22 respectively, which complement each other and sandwich the fabric of the garment partially shown and indicated by reference numeral 24. The two casing members may be suitably secured to each other by the nut and bolt assembly illustrated by numeral 26. Axially aligned bores 28 and 30 formed in the respective casing members 16 and 18 are circumferentially dimensioined to receive the respective internal and external male connectors.

Figure 3:
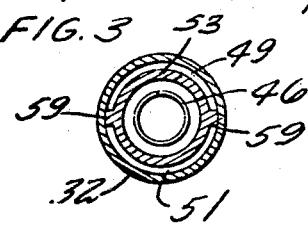
FIGURE 3 is a sectional view taken along lines 3—3 of FIG. 2.

The internal male connector 12 comprises an outer sleevelike member 32 dimensioned to fit into bore 28 and carries on the outer peripheral diameter seal 34 adapted to engage the internal diameter of bore 28. The purpose of this seal as will be evidenced from the description to follow is to prevent the escapement of air internally of the suit to the ambient. Mounted internally of male connector 12 is sliding valve element 36 which serves to open the ports 38 and 43 for leading fluid through the connector into opening 40 of the supply and return conduits 45 and 47 (FIG. 4) which is connected to the tubes in the suit, not shown. Ports 38 and 43 communicate with passages 49 and 51 defined between sleeve 32 and axially extending member 53. Member 53 may be secured to the inner diameter of sleeve 32 by brazing the two pieces at the circumferential edge of the outward extending flange 57 of member 53. As can be seen by referring to FIG. 3, member 53 carries diametrically opposed baffle plates 59 extending to the inner diameter of sleeve 32 to define the two semicircular passages 49 and 51.

The inner periphery of sleeve-like element 32 carries an annular sliding seal element 44 and member 53 carries a similar seal 42 which bears against the outer periphery of sliding valve element 36 to prevent the escapement of liquid when the connector unit is disconnected. Spring 46 retained on one end by spring retainer 48 suitably held by member 50 serves to urge the sliding element 36 in the position shown in FIG. 2. Radial extending flange 52 formed on the end thereof abuts against a shoulder formed internally on member 53. This prevents the valve element from becoming dislodged. When the male element is inserted into bore 28, tab 54 extending radially from sleeve 32 is adapted to fit into groove 56 formed in the female connector element 10 and serves to bear against the left end of sliding rod 60. The opposite end of rod 60 is beveled and engages beveled surface 62 of plunger 64 which plunger is spring loaded in a downward direction by spring 66. Tab 54 engaging the end of element 60 urges it to the right which in turn moves plunger 64 in an upward direction and positions tab 68 away from the cavity 28. The purpose of tab 68 is to engage slot 70 formed in the sleeve-like element 72 of male connector 14. This prevents male connector 14 from being disconnected should for some reason the male connector 12 be out of position. Thus, it can be seen that the only way that external male connector 14 can be disconnected is by connecting internal male connector 12. Otherwise, if both male connectors become disconnected, air from inside the space suit would escape to ambient.

The male connector 14 as can be seen from FIGS. 1 and 2 carries valve element 74 which is retained in valve sleeve 76 firmly secured to the outer casing member 72 by the bolt 78 shown passing through flange 80. Spring 82 seated against the right-hand end of the radially outward extending flange 80 serves to urge the valve element 74 to the left. In the disconnected position as shown in FIG. 2 flange 84 butts against a shoulder formed on the internal diameter of casing member 72 to retain element 74. The inner diameter of valve element 74 carries a pair of spaced annular grooves 86 retaining annular seals which serve to prevent the escapement of liquid between the sliding fitting of valve element 74 and the axially extending portion 88 of member 76. As noted, the seals disposed in grooves 86 are axially spaced on opposite sides of ports 90 and 91 formed in the axially extending portion 88. Member 76 is cylindrical in shape and carries a partition 92 dividing it into two separate semicircular compartments 94 and 96. Openings 98 and 100 communicate with said compartments 94 and 96 for leading fluid into 96 and out of 94 respectfully.

Thus, to connect the male connector to the female connector which is already mounted onto the fabric of the suit, the internal connector is inserted into bore 28 and the tab 54 engages the end of sliding member 60 for retracting plunger 68 radially outward. Male connector 12 is locked into position by virtue of the radially extending tab 104 which engages the latching mechanism generally illustrated by numeral 106, to be described in more detail in the description to follow. When the internal male element 12 is inserted in position, the male element 14 can next be inserted by aligning the upward projecting tab 105 with groove 108 permitting the whole unit to slide into bore 30 so that tab 106 engages the latching mechanism generally illustrated by numeral 110. Sleeve 72 is circumferentially dimensioned so that it fits between the inner wall of bore 28 and the outer diameter of element 32 whereon it engages about its external periphery sliding seal 112.

When external male connector 14 is inserted, the internal end of element 88 and 114 engages the sliding valve element 36 retracting it axially inwardly against the spring 46 uncovering the end opening of port 38. Simultaneously, end face 120 of element 32 engages the sliding element of 74 and urges it axially inwardly against spring 82 for opening ports 90 and 91.

It is apparent from the foregoing that communication is established between openings 40 and 100 and openings 41 and 98. Thus, liquid may be conducted through opening 100, chamber 96, opening 90, passage 38 and opening 40 and then may be returned through opening 41, passage 43, port 91, semicircular chamber 94 and opening 98. Noting that the insertion of the two male elements required no more than aligning the tabs relative to the slot and axially sliding them into the female connector 10. This obviates the necessity of any turning which in the heretofore known connectors was necessary for locking the male to the female connectors. Additionally, the only force that is required for inserting the two male connectors into the female connector is that necessary to overcome the spring forces exerted by spring 82 and spring 46 as there is no fluid pressure opposing the movement of these valves. The only other force, obviously, will be the friction force which is created by the sliding of the elements relative to their stationary parts.

Figure 4:
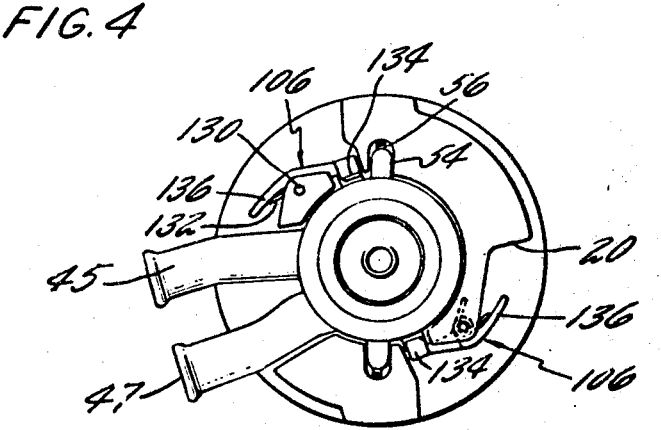
FIGURE 4 is a side view in elevation taken along the lines of 4—4 of FIGURE 1.
Figure 5:
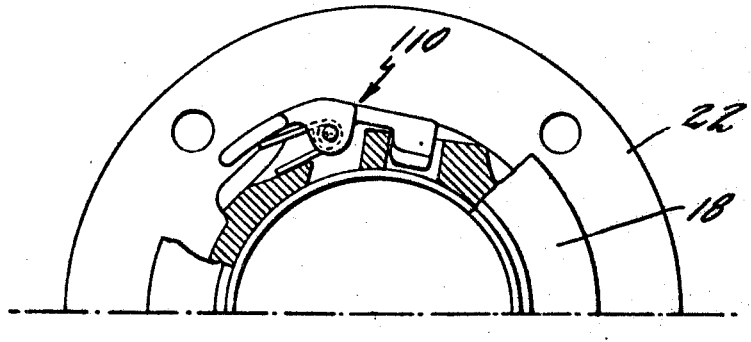
FIGURE 5 is a partial view partly in section taken along the lines of 5—5 of FIG. 2.

Locking is accomplished by the latching mechanism 106 and 110 which can be best seen by referring to FIGS. 4 and 5. As noted by the end view of FIG. 4, pipes 45 and 47 are shown in full adjacent the latching mechanism 106. The lach comprises a handle suitably pivoted about pivot 130 and spring loaded by torsional spring 132 so that the butting end 134 is in the radially inward position. Depressing the other end of handle 136 permits the latching end 134 to move away from tab 104 to allow the unit to become disconnected. The spring 132 can best be seen by referring to the bottom portion of FIG. 4 noting that one end is locked into housing 20 and the other end bears against the inner end of handle 136 urging the other tab end 134 in the inward direction. It can also be seen from FIG. 4 that tabs 54 fit into grooves 56 for moving the sliding plunger 60 in the inner direction. Suitable means, as for example a pin (FIGS. 1 and 2), may be incorporated to keep the plunger from sliding outward. The end of the pin fits into a groove 142 (FIG. 2) formed in member 60 permitting axial movement in one direction and restraining it in the other.

A similar latching mechanism 110 is illustrated in FIG. 5 and is made substantially identical to the latching mechanism illustrated by numeral 106 and functioning identically thereto.

We claim:

1. A concentric coupling adapted to be mounted on a pressurized suit which is subjected to leaking pressurized fluid to the surrounding ambient wherein said coupling contains multiple passages for conducting a heat transport medium to and from internally of said suit comprising in combination, a female coupling having a concentric sleeve member with passthrough axial bore, adapted to be mounted on a pressurized suit, a first male coupling having an outer first sleeve circumferentially dimensioned to snugly fit into said bore and axially extending therein a substantial distance, axially movable valve means coaxially mounted relative to the centerline of said bore and said sleeve, said valve means adapted to uncover ports formed transverse to the centerline and communicating with coaxial passages formed adjacent said sleeve for leading fluid to and from internally of said sleeve through openings communicating with said coaxial passages, a second male coupling having an outer second sleeve circumferentially dimensioned to snugly fit into said bore and to axially extend a substantial distance, a fixed concentric element in said second outer second sleeve having wall means on its internal end adapted to engage said valve means and move it axially to uncover said ports, second axially movable valve means having end wall means engageable with the end surface of said first sleeve positioning said second valve means to uncover additional transversely disposed ports formed in said fixed concentric element and registering with said ports when in the coupled position.

2. A concentric coupling as claimed in claim 1 wherein said first and second male couplings each carry axially spaced annular seal means mounted adjacent said ports.

3. A concentric coupling as claimed in claim 1 wherein said diameter of the inner end of said outer first sleeve is reduced defining together with the wall of said pass-through bore an annular space, an annular projection on said outer second sleeve dimensioned to snugly fit into said space.

4. A concentric coupling as claimed in claim 3 wherein said concentric sleeve member of said female coupling carries a movable locking element movable transversely relative to said centerline and projecting into said bore, means adapted to urge said locking member into said bore, means carried by the outer first sleeve for urging said locking member away from said bore whereby said locking member fits into a transverse slot formed on the end of the outer second sleeve when the first male coupling is disconnected.

5. A concentric sleeve as claimed in claim 3 wherein last mentioned means include a slidably mounted plunger having a cam face, a complementary cam face on said locking member in engagement therewith and an outward projecting element on the outer periphery of said first sleeve adapted to engage said slidably mounted plunger.

6. A concentric coupling as claimed in claim 1 in which said concentric sleeve member of the female coupling includes diametrically opposed axial slots formed in the internal diameter adjacent said bore, outward protruding lugs formed on the outer periphery of said outer first sleeve and said outer second sleeve adapted to slide into the respective slots, and latching means carried on the respective end of said concentric sleeve member adjacent the respective slots for engaging said respective lugs.

References Cited

UNITED STATES PATENTS 2,954,562 10/1960 Krupp _____ 2—2.1

FOREIGN PATENTS 829,096 2/1960 Great Britain.

WILLIAM F. O'DEA, Primary Examiner

H. M. COHN, Assistant Examiner

U.S. Cl. X.R.

2—2.1; 137—614.06; 285—18, 308